Figure 1:
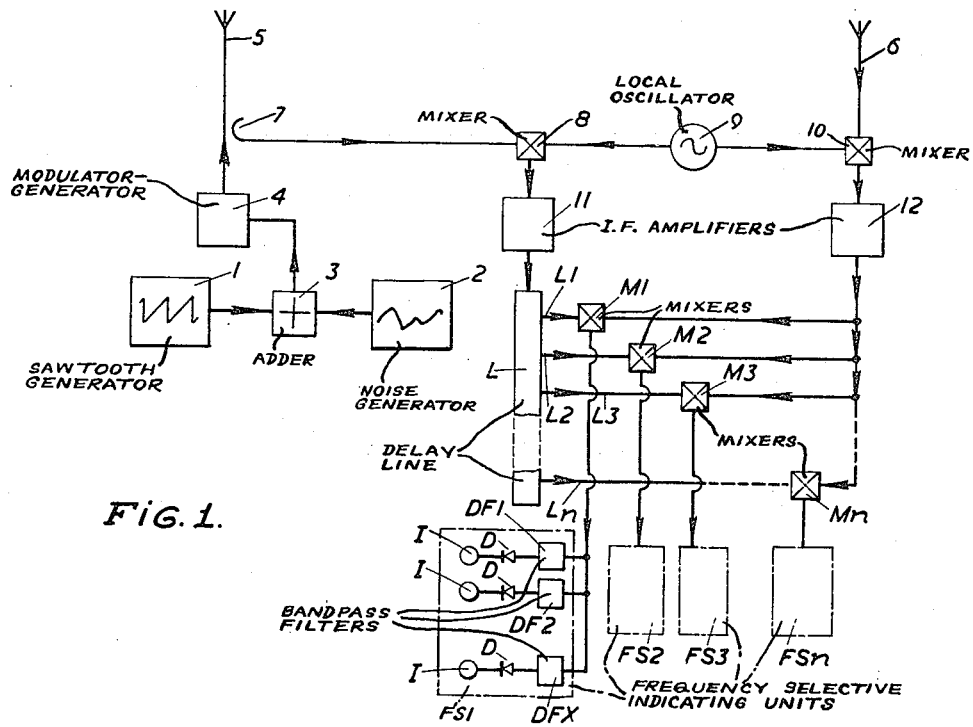

June 8, 1965

J. H. BLYTHE 3,188,635

RADAR SYSTEMS

Filed Aug. 20, 1962

INVENTOR
John Hosking Blythe
BY Baldwin & Wight
ATTORNEYS 3,188,635
RADAR SYSTEMS
John Hosking Blythe, Chelmsford, England, assignor to
The Marconi Company Limited, London, England, a
British company
Filed Aug. 20, 1962, Ser. No. 217,845
Claims priority, application Great Britain, Aug. 31, 1961,
31,318/61
14 Claims. (Cl. 343—14)

This invention relates to radar systems and seeks to provide improved radar systems which will detect moving targets even in the presence of considerable clutter. As will be seen later, the invention can be used to detect and measure the range and or velocity of moving targets under conditions of very adverse clutter.

The detection, in the presence of clutter, of moving targets giving only weak return echo signals, and the reliable and unambiguous measurement of their range and or velocity present problems which have not previously been satisfactorily solved though numerous different radar systems have been proposed for the purpose. Probably the most widely used of the known systems so far proposed is the so-called delay type of M.T.I. (moving target indicator) pulsed system. This type of system, which is too well known to require description here, has the serious defects (also well known) (1) that it has "blind speeds," inasmuch as targets whose radial velocities are such as to result in Doppler frequencies which are integral multiples of the pulse repetition frequency are not "seen" by the system and (2) the obtaining of a large cancellation ratio is incompatible with the obtaining of high data rate. (Cancellation ratio may be defined as the clutter amplitude signal amplitude ratio obtained without the application of M.T.I. divided by the clutter amplitude signal amplitude ratio obtained when M.T.I. is used.) The cancellation ratio depends on the number of strikes on the target which occur as the scanning radio beam moves across it and since a large cancellation ratio requires a large number of strikes, the obtaining of a large cancellation ratio involves the use of a correspondingly low scanning speed and therefore a low data rate. It is not practicable to avoid these defects by increasing the pulse repetition frequency because, if this is done, range ambiguities are introduced and any obscuring short range clutter which may be present will also obscure other areas within the overall range of the system.

It has been proposed to meet the difficulties just mentioned by using instead of a constant time interval between successive transmitted pulses, a varying time interval varying in random manner from pulse to pulse so that any pulse may occur within a time period T extending on either side of the moment at which that pulse would occur if a constant time interval were employed. It may be shown that if this is done blind speeds corresponding to Doppler frequencies above $1/T$ are removed so that, to remove all blind speeds, T must be equal the mean time interval between pulses. This results in a uniform spreading in range of the effect of clutter so that a piece of clutter giving a certain power level $p$ at a given range will appear at all ranges as uniform clutter at a level $pT_p/T$ where $T_p$ is the pulse length. Typical practical values of $T_p$ and T are $10^{-6}$ and $10^{-2}$ secs. respectively so that, with these figures, a reduction of effective power level of 40 db's is all that is obtained. This is quite inadequate, since (to give a typical example) a reduction of effective power level of 74 db's is required in order to detect a target of 1 square metre reflecting area at a range of 20 kms. in the presence of clutter of 10 sq. ms. effective reflecting aera at a range of 0.5 km., the range difference requiring 64 db's to effect it and the area difference requiring the remaining 10 db's.

Defects and limitations are also encountered with known continuous wave (C.W.) radar systems. Moving targets can, of course, be detected and their velocities measured by transmitting a constant frequency C.W. and employing in the receiver a suitable filtering and frequency measuring arrangement for separating and measuring Doppler frequencies from targets. Such a simple system gives, however, no range information. Range information about a single target may be obtained by transmitting two different constant frequencies but, as is well known, such a system has no range resolution and will give incorrect range information if two or more targets are simultaneously in the scanning beam. In other known C.W. systems range resolution is obtained by frequency modulating the transmitted C.W., the resolution being of the order of $C/2B$ where C is the velocity of light and B is the deviation bandwidth of the frequency modulation. Theoretically such frequency modulation may be repetitive or random. In the former case, which is that adopted in the usual known radar systems of the frequency modulated C.W. type, blind speeds analogous to those above mentioned in connection with known pulsed radar systems are encountered. In the latter case—use of random or non-repetitive frequency modulation—there are other defects or limitations. With random frequency modulation, it may be shown that, if B is the deviation bandwidth of applied random frequency modulation and $B_1$ is the overall bandwidth of the system—taken to be the reciprocal of the time in which the scanning beam scans across a target—a piece of clutter giving an effective power level $p$ will appear as uniform clutter at all ranges with a level $pB/B_1$. A typical practical value of $B_1$ is 100 c./s. so that, for a power reduction of 74 db's, B must be $2.5 \times 10^9$ c./s.—a quite impractical figure at the present stage of development.

According to this invention a moving target detecting radar system comprises means for transmitting a continuous radio wave which is simultaneously subjected to repetitive frequency modulation and to random frequency modulation, means for receiving reflected echo signals, and means for ascertaining the time interval between transmitted and received signals which are substantially in correlation with one another.

Preferably the system also includes means for producing combination signals from transmitted and received signals which are substantially in correlation with one another, and frequency selective means for determining Doppler frequencies present in the combination signals.

Preferably the transmitted continuous wave is frequency modulated in accordance with a periodically recurrent saw-tooth law of predetermined frequency slope, and amplitude and is also simultaneously frequency modulated in random fashion over a band of frequencies, the width of which is substantially constant and less than the width of the band of frequencies over which said wave is frequency modulated in saw-tooth fashion.

In the preferred embodiments of the invention, a radar system includes a continuous wave transmitter, a so-called noise waveform generator, a saw-tooth waveform generator, means for combining the outputs from the two generators to produce a combination modulating wave, and means for applying the combination modulating wave to modulate the frequency of the continuous wave transmitter.

Also in the preferred embodiments of the invention a radar system includes means for delaying signals derived from signals being transmitted to produce signals which are substantially in correlation with signals derived from incoming received signals, means for mixing the delayed correlated signals with the signals derived from said incoming received signals to produce combination signals and means dependent on the amount of the delay applied to produce the correlated delayed signals for ascertaining range. Where target velocity information is also required the combination signals are fed to frequency selective means adapted to determine Doppler frequencies present therein.

One form of radar system in accordance with the invention comprises a noise waveform generator; a sawtooth waveform generator; an adder connected and adapted to add the outputs from the two generators; a continuous wave transmitting source; means for applying output from said adder to modulate said source in frequency; a tapped delay line; means for feeding signals derived from the modulated transmitted signals from said source to said delay line; a plurality of correlated signal mixers each having one input fed from a different one of the taps on the delay line; means for feeding signals derived from incoming received signals to the second inputs of the mixers; and means for determining which of the mixers is fed, at its two inputs, with signals in substantial correlation with one another. Preferably the derived signals fed to the delay line and the signals derived from incoming received signals and fed to the mixers are intermediate signals derived from the transmitted signals and from said incoming received signals by means including a common local oscillator. Where target velocity information is required the output from each mixer is fed to frequency selective means adapted to determine Doppler frequencies present. Each such frequency selective means may conveniently comprise a plurality of filters, each selective of different narrow range of Doppler frequencies, fed in parallel from one of the mixers, and indicator means responsive to the output of each filter. In such an arrangement the presence of a moving target at a certain range will produce an output from one of the mixers and the speed of the target will be given by the particular indicator means which responds, the frequency selective means of which that particular indicator forms a part indicating the range of the target.

Figure 2:
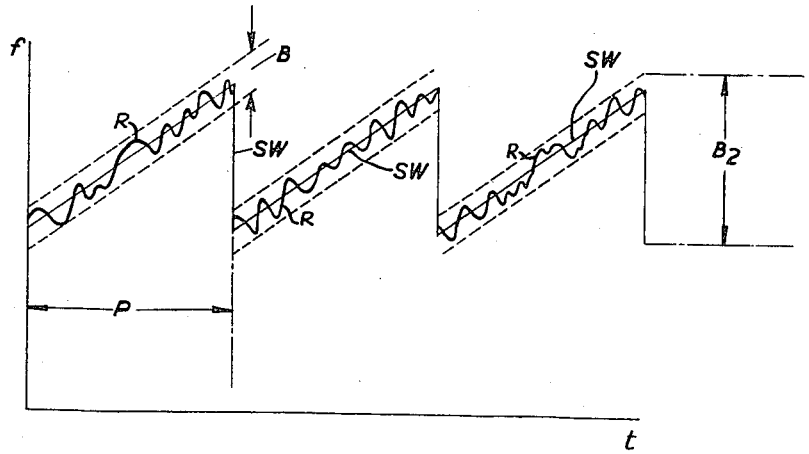

The invention is illustrated in and further explained in connection with the accompanying drawings in which FIGURE 1 is a highly simplified block diagram showing one embodiment of the invention only to the extent necessary to an understanding thereof and FIGURE 2 is a graphical explanatory figure.

Referring to FIGURE 1, a generator 1 of sawtooth waves and a so-called noise generator 2 of any convenient known form feed their outputs into a combining adding circuit 3, the combined output from which is employed in any known manner to modulate in frequency continuously generated microwave oscillations produced by a microwave generator in a modulator-generator unit 4. The microwave energy transmitted will accordingly be modulated in frequency in a repetitive or periodic manner due to the action of generator 1 and also, simultaneously, in a random manner due to the action of generator 2. For simplicity in drawing transmitting and receiving aerials are represented at 5 and 6 as though they were open aerials but in fact, of course suitable directional scanning aerial arrangements in accordance with known microwave radar practice would be employed.

FIGURE 2 shows in conventional graphical manner the nature of the modulation employed. In this figure $f$ is frequency and $t$ is time. The saw-tooth wave SW represents the component of frequency modulation due to the action of generator 1 and the irregular wave R represents the total modulation due to the addition of the random wave from generator 2 to the wave from generator 1. For simplicity in drawing no random component is shown on the saw-tooth flybacks—which are almost instantaneous—though theoretically, of course, there will be a random component there too. The width of the band of random deviation is indicated by B while that of the total deviation is indicated by $B_2$.

Modulated transmitted energy is branched off by a coupler 7 and fed as one input to a mixer 8 whose second input is obtained from a reference local oscillator 9. This oscillator also supplies one of the inputs to a mixer 10 whose other input is fed with incoming received signals. The outputs from mixers 8 and 10 are amplified in intermediate frequency amplifiers 11 and 12 respectively. Amplifier 11 feeds into a tapped delay line L having a plurality of taps $L_1$, $L_2$, $L_3$ ... $L_n$. The signals in the delay line L will be modulated in the same manner as the transmitted energy and each tap will give an output with a different time delay. These delayed outputs are fed as reference signals to mixers $M_1$, $M_2$, $M_3$ ... $M_n$ whose second inputs are fed in parallel from the amplifier 12. Each of the mixers $M_1$ to $M_n$ feeds into one or other of a corresponding number of frequency selective indicating units represented by chain line blocks $FS_1$ to $FS_n$. All these units are alike but only one ($FS_1$) is shown with any detail. Each unit comprises a number of Doppler frequency separating narrow band pass filters $DF_1$, $DF_2$ ... $DF_x$ each followed by a rectifier D and a suitable indicator I of any convenient known form adapted to give an indication when the filter from which it is fed passes signals. The filters pass different adjacent narrow bands of Doppler frequencies so that each indicator will indicate a target of a different radial velocity lying within the whole range of target velocities which the system is designed to handle.

The system operates as follows: Suppose a target to be present at some range R. The return from this target will have the same frequency modulation as the unique reference, i.e. the transmitted signal of which it is the reflection, but will be delayed with respect thereto by a time $2R/C$. Correlation between the return and the reference will be substantially complete if the reference is so delayed that the time difference between them does not exceed ¼ $B_2$. If, therefore, the taps on the delay line are properly chosen, a target at any particular range will produce substantially correlated signal inputs to one only of the mixers $M_1$ to $M_n$ and this mixer only will give an output. Knowledge of which mixer receives correlated inputs accordingly gives range information and, if only range information is required this can be obtained by suitable indicators each fed directly by a different one of the mixers $M_1$ to $M_n$ so that the one which responds indicates target range by so responding. In the illustrated embodiment, however, both range and velocity information is given. A target at a particular range will cause output to occur from one of the mixers $M_1$ to $M_n$—the particular mixer depending on the range—and this mixer will pass to the associated one of the units $FS_1$ to $FS_n$ signals of a frequency which will pass one of the filters $DF_1$ to $DF_x$ in that unit, the particular filter depending on Doppler frequency and therefore on target velocity. Accordingly for any target range and velocity one indicator I will respond, the unit of which that indicator forms a part giving the range information and the particular indicator responding giving the velocity information. The number of filters in each unit $FS_1$ to $FS_n$ should be, ideally, the total Doppler bandwidth to be handled, divided by the final bandwidth of the system which may be taken as the reciprocal of the time taken by the scanning beam to scan across a target. For complete range cover the time delay along the line L between successive taps should be ½ $B_2$ so that, to cover a maximum range Z the number of taps should be $2B_2 \times 2Z/C = 4B_2Z/C$. In some cases this may result in a very large total number of Doppler filters (such as $DF_1$) in an arrangement as shown in FIGURE 1 but suitable known methods of synthesizing a large number of filters using a smaller number of components may be used.

The principles underlying the dimensioning of a radar system in accordance with this invention will be understood from the numerical example which follows: Suppose the time taken by the scanning beam to scan across a target is 10 millisecs. If the angular spread of the beam is 1.8° this corresponds to an azimuth scanning speed of 1 revolution in 2 secs., i.e. a data rate of 1 plot in 2 secs. Suppose the final bandwidth be taken as 100 c./s. and the required cancellation ratio is 26 db's. Then the bandwidth B (FIGURE 2) should be 400×100 c./s.=40 kc./s. The rate of change of frequency with time ($df/dt$) due to the saw-tooth wave SW (see FIGURE 2) is next chosen. A practical consideration is that, in order to give good short range performance and good cancellation when there is a large difference between clutter range and target range, $df/dt$ should be such that targets differing in range by more than about 2 kms. should return non-overlapping frequency bands. Since a range difference of 2 kms. corresponds substantially to a delay of 12.7μsecs. $df/dt$ should be $$\frac{40 \times 10^3}{12.7 \times 10^{-6}} = 3 \times 10^9 \text{ c/sec.}^2$$

The saw-tooth repetition period P (see FIGURE 2) must be at least equal to $2Z/C$ where Z is, as before, the maximum range required. If Z is 20 kms., P should be 127μsecs. whence $B_2$ is 400 kc./s. The range resolution is roughly equivalent to that of an ordinary pulsed system using pulses 1.25μsec. long so that for a value of Z of 20 kms. the delay line L should have 102 taps. If the overall Doppler frequency band to be handled is 20 kc./s. wide, each unit $FS_1$ to $FS_n$ should contain 200 filters if the arrangement illustrated in FIGURE 1 is used, though, as already stated, any known method of obtaining the same filtering result from a smaller number of components may be used.

I claim:

1. A moving target detecting radar system comprising means for transmitting a continuous radio wave which is simultaneously subjected to repetitive frequency modulation and to random frequency modulation, means for receiving reflected echo signals, and means for ascertaining the time interval between transmitted and received signals which are substantially in correlation with one another.

2. A system as claimed in claim 1 and which includes also means for combining signals derived from transmitted and received signals which are substantially in correlation with one another to form combination signals, and frequency selective means for determining Doppler frequencies present in the combination signals.

3. A system as claimed in claim 1 wherein the transmitted continuous wave is frequency modulated in accordance with a periodically recurrent saw-tooth law of predetermined frequency, slope, and amplitude and is also simultaneously frequency modulated in random fashion over a band of frequencies, the width of which is substantially constant and less than the width of the band of frequencies over which said wave is frequency modulated in saw-tooth fashion.

4. A system as claimed in claim 1 wherein said transmitting means comprises a continuous wave transmitter, a noise waveform generator, a saw-tooth waveform generator, means for combining the outputs from the two generators to produce a combination modulating wave, and means for applying the combination modulating wave to modulate the frequency of the continuous wave transmitter.

5. A system as claimed in claim 1 and including means for delaying signals derived from signals being transmitted to produce signals which are substantially in correlation with signals derived from incoming received signals, means for mixing the delayed correlated signals with the signals derived from said incoming received signals to produce combination signals, and means dependent on the amount of the delay applied to produce the correlated delayed signals for ascertaining range.

6. A system as claimed in claim 5 wherein the combination signals are fed to frequency selective means for determining Doppler frequencies present therein, whereby target velocity information is also obtained.

7. A moving target detecting radar system comprising a noise waveform generator; a saw-tooth waveform generator; an adder connected and adapted to add the outputs from the two generators; a continuous wave transmitting source; means for applying output from said adder to modulate said source in frequency; a tapped delay line; means for feeding signals derived from the modulated transmitted signals from said source to said delay line; a plurality of correlated signal mixers each having one input fed from a different one of the taps on the delay line; means for feeding signals derived from incoming received signals to the second inputs of the mixers; and means for determining which of the mixers is fed, at its two inputs, with signals in substantial correlation with one another.

8. A system as claimed in claim 7 wherein the derived signals fed to the delay line and the signals derived from incoming received signals and fed to the mixers are intermediate signals derived from the transmitted signals and from said incoming received signals by means including a common local oscillator.

9. A system as claimed in claim 7 wherein the output from each mixer is fed to frequency selective means adapted to determine Doppler frequencies present, whereby target velocity information is also obtained.

10. A system as claimed in claim 9 wherein each frequency selective means comprises a plurality of filters, each selective of a different narrow range of Doppler frequencies, fed in parallel from one of the mixers, and indicator means responsive to the output of each filter.

11. A moving target detecting radar system comprising means for transmitting a continuous R-F signal which is simultaneously subjected to repetitive frequency modulation and to random frequency modulation, means for receiving reflected echo signals, means for delaying a portion of the transmitted signal retained within the radar system, and range measuring means for ascertaining the amount of time delay required to bring said portion of the transmitted signal and the received reflected echo signal substantially into correlation with one another.

12. A moving target detecting radar system comprising means for transmitting a continuous R-F signal which is simultaneously subjected to repetitive frequency modulation and to random frequency modulation, means for receiving reflected echo signals, means for retaining a portion of the transmitted signal within the radar system, means for variably delaying said retained signal portion, and measuring means for indicating both the range and the velocity of a target, said measuring means including means for combining the delayed signal portion and the received reflected echo signal to ascertain the amount of time delay required to bring them substantially into correlation, which is a measure of range, and frequency selective means for determining any Doppler frequency present in the output of said combining means, which is a measure of target velocity.

13. A moving target detecting radar system comprising a source of transmitted signals, means for simultaneously modulating the frequency of said source with a repetitive modulating signal and with a random modulating signal, means for receiving reflected echo signals, means for retaining a portion of the transmitted signal within the radar system, means for variably delaying said retained signal portion, and range measuring means for ascertaining the amount of time delay required to bring said delayed signal portion and the received reflected echo signal substantially into correlation with one another.

14. A system as claimed in claim 13, wherein said measuring means also includes frequency selective means for determining Doppler frequencies present therein, which provides a measure of target velocity.

References Cited by the Examiner

UNITED STATES PATENTS 2,768,372 10/56 Green _____ 343—100.7
2,923,004 1/60 Warnecke _____ 343—14

CHESTER L. JUSTUS, *Primary Examiner.*